Figure 5:
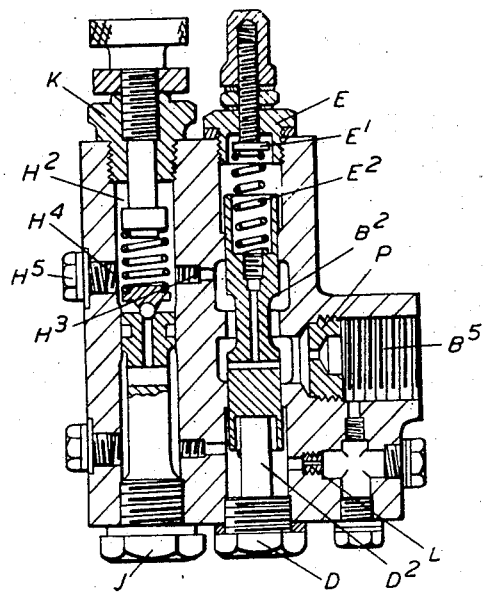

Oct. 14, 1958　　　　　　　N. LEE　　　　　　2,855,947
PRESSURE RESPONSIVE VALVES
Filed Oct. 12, 1953　　　　　　　　　　　　7 Sheets-Sheet 1
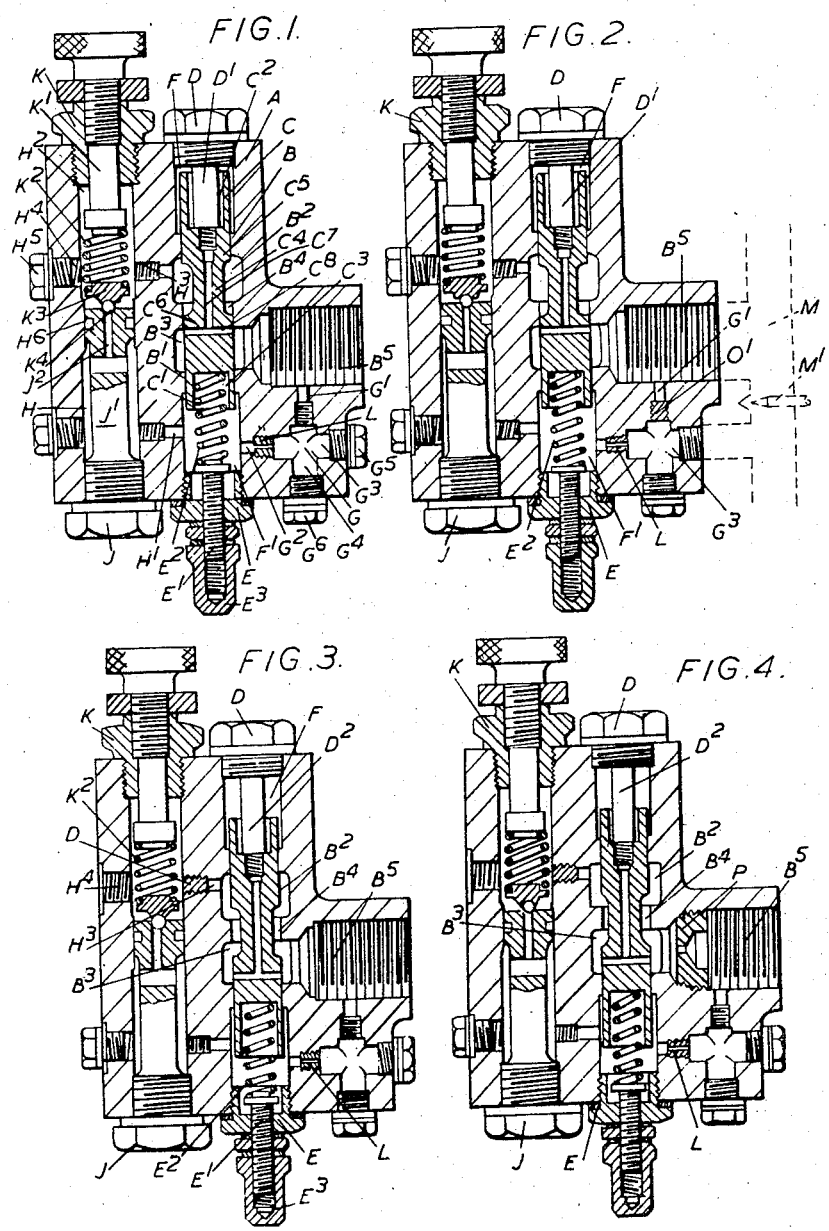
INVENTOR
NORMAN LEE
BY Holcombe Wetherill y Buisbois
ATTORNEY Oct. 14, 1958  N. LEE  2,855,947
PRESSURE RESPONSIVE VALVES
Filed Oct. 12, 1953  7 Sheets-Sheet 6

INVENTOR
NORMAN LEE

BY Holcombe, Wetheill & Burlow
ATTORNEY

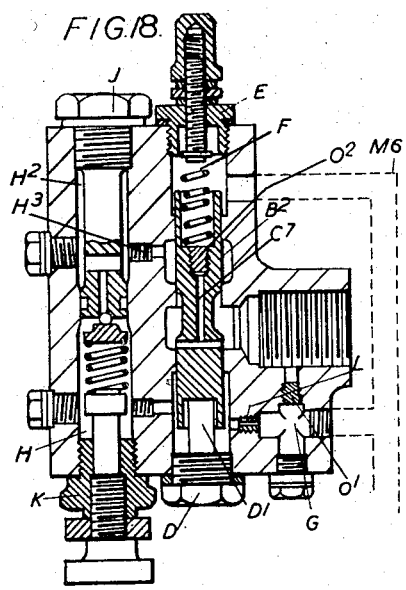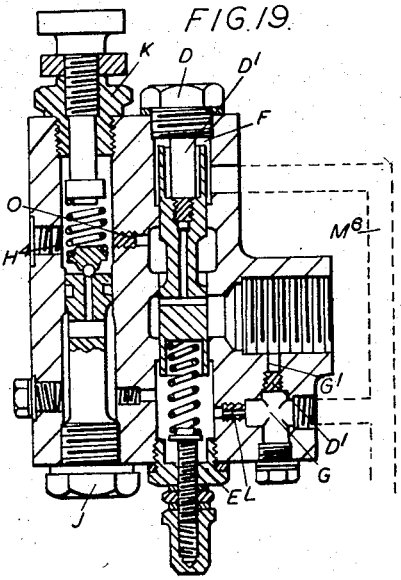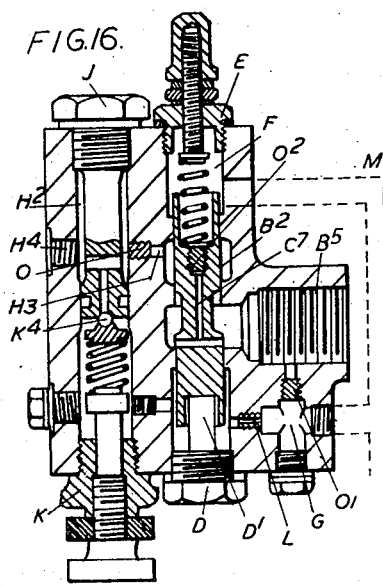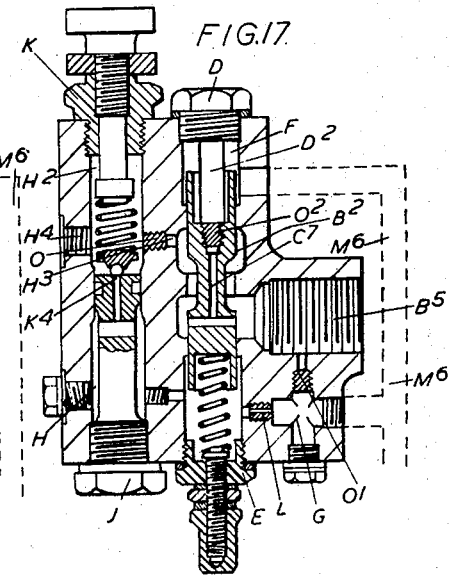

United States Patent Office 2,855,947
Patented Oct. 14, 1958

2,855,947

PRESSURE RESPONSIVE VALVES

Norman Lee, Coventry, England, assignor to The Keelavite Company Limited, Coventry, England, a company of Great Britain Application October 12, 1953, Serial No. 385,647

Claims priority, application Great Britain October 15, 1952

9 Claims. (Cl. 137—269)

This invention relates to pressure responsive hydraulic valve assemblies and has for its object to provide a form of construction which will not only be simple to manufacture and satisfactory in operation but will incorporate to a large degree a set of standard parts capable of assembly in a considerable variety of different ways according to the purpose for which the valve is to be used and the function which it is to perform.

According to the present invention a pressure responsive valve assembly comprises a valve housing having formed therein a valve chamber (hereinafter called the main valve chamber) comprising coaxial cylindrical end portions between which lie an inlet chamber and an outlet chamber (hereinafter called flow chambers) separated by a cylindrical port or passage (hereinafter called the port) through which the main flow from the inlet chamber to the outlet chamber is to take place, which is coaxial with the end portions of the valve chamber and of approximately the same diameter as them, and a valve member (hereinafter called the main valve member) of the piston type arranged within the main valve chamber and including piston like end portions which slide respectively in the end portions of the main valve chamber, and an intermediate portion of smaller diameter than the end portions which, when the valve is open, extends through the port, the end portions of the valve chamber beyond the ends of the main valve member constituting chambers (hereinafter called pressure chambers) in which pressures acting on the ends of the main valve member can exist and by their relationship determine the position and/or movement of the main valve member.

It will be understood that complete closing of the valve when effected takes place by reason of one or other of the end portions of the main valve member entering the port.

Conveniently a passage is provided (preferably passing through the main valve member) by which one of the pressure chambers is permanently connected to the flow chamber which lies on the side of the port more remote from such pressure chamber, while the housing includes a passage leading from the other pressure chamber to one side of a spring-pressed auxiliary relief valve (hereinafter called a pilot valve) arranged to open when the pressure acting on it either from such pressure chamber or from some external passage exceeds a predetermined value. Moreover in such an arrangement the pilot valve is preferably arranged in a pilot valve chamber formed in the valve housing adjacent to the main valve chamber and controls a port between the two ends of the pilot valve chamber, that is to say between the end which communicates with the appropriate pressure chamber and the other end of the pilot valve chamber. Moreover the pilot valve chamber conveniently contains means whereby the pressure exerted on the pilot valve by its spring can be adjusted from outside the housing.

Thus in a preferred form of valve assembly according to the invention the valve assembly comprises a valve housing having formed therein an open-ended main valve chamber and an open-ended pilot valve chamber, the main valve chamber comprising coaxial cylindrical end portions of the same effective diameter between which lie an inlet flow chamber and an outlet flow chamber separated by a cylindrical port or passage which is coaxial with and of approximately the same diameter as the end portions, a main valve member of the piston type arranged within the main valve chamber and including piston-like end portions which slide respectively in the end portions of the main valve chamber and an intermediate portion of smaller diameter than the end portions which, when the valve is open, extends through the port, the end of the valve chamber beyond the ends of the main valve member constituting pressure chambers in which pressures acting on the ends of the main valve member can exist, a main valve spring abutment assembly closing one end of the main valve chamber and including a spring abutment, a spring (hereinafter called the main valve spring) one end of which bears against the said abutment while the other end bears on the main valve member, a stop assembly closing the other end of the main valve chamber and including a stop member for limiting the movement of the main valve member towards the said abutment assembly, a pilot valve assembly including a part which closes one end of the pilot valve chamber and a part which separates one end of this chamber from the other and contains a pilot passage one end of which is closed by a pilot valve seated therein, a pilot valve spring abutment assembly including a part which closes the other end of the pilot valve chamber and a part constituting a pilot valve spring abutment, and a pilot valve spring one end of which bears against the pilot valve spring abutment while its other end acts on the pilot valve to maintain it normally in contact with its seating.

Preferably according to a further feature of the invention the stop assembly and the main valve spring abutment assembly are interchangeable in the ends of the main valve chamber so that the spring can be arranged to operate on either end of the main valve member while the stop assembly acts as a stop for the other end of the main valve member.

Moreover stop assemblies having alternative lengths of stop or an adjustable stop may be provided.

Further, according to another preferred feature of the invention the pilot valve assembly and the pilot valve spring abutment assembly are interchangeable in the ends of the pilot valve chamber so as to enable these assemblies to be arranged so that the direction of opening of the pilot valve is in either direction.

A number of pressure responsive valve assemblies embodying the invention and incorporating, apart from minor additions in certain cases and omissions in certain other cases, identical sets of parts, are illustrated in the drawings which accompanied the provisional specification filed with the present application, each of such drawings being in the form of a sectional elevation showing the essential parts of one arrangement of valve assembly according to the invention.

In each of the constructions illustrated in Figures 1 to 19 of the drawings referred to, the valve unit comprises a housing A in which is formed a valve chamber (hereinafter called the main valve chamber) of generally cylindrical form, and shown in the drawings as vertical, the upper and lower ends of which chamber are coaxial and include parts B, B¹ which are cylindrical and of the same diameter. Lying between the parts B, B¹ are annular inlet and outlet chambers B², B³ of larger diameter than the parts B, B¹ separated by a cylindrical port or short passage B⁴ coaxial with and of the same diameter as the parts B, B¹. The chambers B² and B³, either of which may be the inflow chamber communicate respectively with main flow passages of which that communicating with the chamber $B^3$ is shown at $B^5$ while that communicating with the chamber $B^2$ is not shown.

Arranged within the valve chamber is a main valve member in the form of a piston comprising upper and lower end portions $C$, $C^1$ which engage and slide respectively within the portions $B$, $B^1$ of the valve member and are counter-bored as shown at $C^2$, $C^3$, a reduced diameter portion $C^4$ providing a "waist" which when the valve is open lies within the port $B^4$, and which is bounded by portions $C^5$, $C^6$ forming in effect inward extensions of the end portions $C$, $C^1$. Extending from the upper end of the valve member is a pressure transmitting passage $C^7$ communicating with its lower end with a transverse passage $C^8$ which lies always in the chamber $B^3$.

The upper and lower ends of the main valve chamber are provided with similar internal screw threads of the same diameter and are closed, one by a plug-like member $D$ having a stop $D^1$ or $D^2$ formed integral therewith and the other by a plug-like member $E$ through which passes a screw threaded adjustable abutment $E^1$ the inner end of which serves as an abutment for one end of a spring $E^2$ the other end of which lies within and engages the end of the adjacent counter-bore $C^2$ or $C^3$ in the valve member, the adjustable abutment being capable of being locked in its position of adjustment by means of a lock nut $E^3$.

It will thus be seen that chambers $F$, $F^1$ are formed in the ends of the main valve chamber in which chambers the pressures act respectively on the ends of the main valve member.

Also formed in the housing $A$ is a chamber $G$ (hereinafter called a junction chamber) with which communicate 4 bores or passages $G^1$, $G^2$, $G^3$, $G^4$, the passage $G^1$ leading to the flow passage $B^5$, the passage $G^2$ leading to the chamber $F^1$, while the passages $G^3$, $G^4$ lead through the outer wall of the housing and are screw threaded so that they can be fitted with plugs $G^5$, $G^6$ or connected to some desired hydraulic passage or chamber according to requirements.

Also formed within the housing $A$ parallel and adjacent to the main valve chamber is a generally cylindrical chamber adapted to house a relief valve. The lower end $H$ of this relief valve chamber communicating through a passage $H^1$ with the chamber $F^1$ while its upper end $H^2$ can communicate through a passage $H^3$ with the chamber $B^2$. The upper end $H^2$ of the relief valve chamber also communicates with a short passage $H^4$ leading through the outer wall of the housing and capable either of being closed by a plug $H^5$ or of being connected to a suitable hydraulic passage or chamber according to requirements. The passages $H^1$, $H^3$ are also screw threaded so that either one or both of them can be closed by a screw threaded plug if desired.

The two ends $H$, $H^2$ of the relief valve chamber are closed, one by a plug $J$ carrying an extension $J^1$ the upper end of which makes a fluid tight seal with a reduced diameter part $H^6$ of the relief valve chamber while the other is closed by a plug $K$ through which passes an adjustable screw threaded thrust member $K^1$ the inner end of which serves as an abutment for one end of a spring $K^2$ the other end of which acts through a pressure member $K^3$ on a ball valve $K^4$ engaging a seating in the end of the part $J^1$ so as normally to close a passage $J^2$ in this part extending between the upper and lower ends $H$, $H^2$ of the relief valve chamber. The ends of the relief valve chamber are of the same diameter so that either one of the plug members $J$ or $K$ can be arranged in either end thereof.

As will be apparent from the drawings the construction of the parts is such that the plug member $D$ carrying the stop $D^1$ or $D^2$ can be arranged at the upper end of the main valve chamber and the plug member $E$ carrying the adjustable abutment $E^1$ with its associated spring $E^2$ is arranged at the lower end of the main valve chamber or vice versa, while similarly the plug member $J$ can be arranged at the lower end of the relief valve chamber while the plug member $K$ and its associated abutment $K^1$, spring $K^2$ and other parts can be arranged at the upper end of the relief valve chamber or vice versa. Moreover a flow restricting member hereinafter called the restricted orifice $L$ can be arranged in the passage $G^1$ or $G^2$ and, by placing such a restricted orifice in the passage $G^2$ and leaving the passage $G^1$ open or by closing the passage $G^1$ and connecting the passage $G^3$ or $G^4$ to some suitable hydraulic passage or chamber the lower end $F^1$ of the main valve chamber can be caused to communicate through the restricted orifice either with the passage $B^5$ or with some appropriate other hydraulic passage or chamber as may be desired.

It will moreover be apparent that each of the arrangements illustrated comprises precisely the same set of parts except that plugs $D$ having two alternative lengths of stop, namely $D^1$ or $D^2$ are provided, and that in the forms of the valve units shown various arrangements of this set of parts have been adopted and in some cases plugs have been inserted in or removed from certain passages to provide a variety of constructions. The general arrangement and function of each of these constructions will therefore now be briefly referred to. For the sake of simplicity while the appropriate reference letters have been applied to all the parts referred to above in Figure 1, the reference letters applied to the other figures have been limited to those which seem necessary for the description of those figures.

The construction shown in Figure 1 is intended to act as a relief valve, and to this end the passage $B^5$ is connected to the high pressure fluid source the pressure in which is to be limited by the valve so that the chamber $B^3$ constitutes the inflow chamber and the chamber $B^2$ the outflow chamber. The passage $B^5$ communicates through the chamber $G$ and the restricted orifice $L$ with the lower end $F^1$ of the valve chamber, while the passages $H^1$ and $H^3$ are open.

The main valve thus remains closed in the position shown except when the pressure in the inflow chamber $B^3$ acting through the passage $C^7$ exceeds that at which the relief valve $K^3$ opens by an amount sufficient to overcome the force of the spring $E^2$, whereupon the pressure in the chamber $F$ forces the valve downwards to open the port $B^4$.

In the construction shown in Figure 2 the form of the valve unit is similar to that shown in Figure 1 except that the passage $G^1$ is closed by a plug $O^1$ and the passages $B^5$ and $G^3$ communicate with a main flow passage $M$ respectively on the upstream and downstream sides of an adjustable or fixed flow control or metering orifice indicated at $M^1$. In this construction, therefore, the main valve moves downwards to relieve pressure in the passage $B^5$ and hence on the upstream side of the flow control orifice $M^1$ whenever the pressure on the upstream side of the orifice $M^1$ tends to exceed that on the downstream side of this orifice by a predetermined amount. Assuming, therefore, that the arrangement is such that a pressure can be maintained on the downstream side of the orifice $M^1$ sufficient just to lift the relief valve $K^4$, the valve unit automatically maintains a predetermined pressure difference across the orifice $M^1$, that is to say a pressure difference such that the higher pressure maintained through the passage $C^7$, $C^8$ in the chamber $F$ just overcomes the pressure in the chamber $F^1$ and the force of the spring $E^2$.

In the construction shown in Figure 3 the arrangement is similar to that shown in Figure 1 except that the longer stop $D^2$ is used instead of the short stop $D^1$ so that the main valve member is normally maintained in the open position shown, the passage $H^3$ is closed by a plug $O$, and the passage $H^4$ is open to relief.

The chamber $B^2$ in this case is connected to a suitable high pressure fluid source and thus constitutes the inlet chamber while the passage $B^5$ is connected to a working pressure line in which a constant pressure is to be maintained. In this arrangement the main valve member is moved downwards to close the port $B^4$ whenever the pressure in the passage $B^5$ and hence in the chamber F is sufficient to overcome the force of the springs $K^2$ and $E^2$ and thus lift the relief valve $K^4$.

In operation, therefore, assuming a pressure in the chamber $B^2$ above that to be maintained in the passage $B^5$, the main valve member moves so as to maintain a substantially constant pressure in the passage $B^5$.

The construction shown in Figure 4 is the same as that shown in Figure 3 except that a metering orifice P is provided in the passage $B^5$. In this arrangement, therefore, the main valve will maintain a rate of flow through the port $B^4$ just sufficient to maintain a predetermined pressure in the passage $B^5$ and a predetermined pressure drop across and hence flow through the orifice P irrespective of variations in the pressure in the inlet chamber $B^2$ and passage $B^5$.

In the construction shown in Figure 5 the plug member D with the longer stop $D^2$ is arranged in the lower end of the main valve chamber while the plug member E with its associated abutment $E^1$ and spring $E^2$ are arranged in the upper end of the main valve chamber, and a metering orifice P is provided in the passage $B^5$, the arrangement being otherwise as shown in Figure 1.

In this arrangement of valve unit the passage $B^5$ is connected to the source of high pressure fluid and the chamber $B^2$ thus constitutes the outlet chamber. The valve unit normally performs the same function as that shown in Figure 4 since the main valve will close whenever the pressure in the chamber $B^2$ drops below a predetermined value relatively to that in the passage $B^5$ and vice versa, and will thus maintain a predetermined pressure drop across the metering orifice P. In addition, however, since the valve $K^4$ will open automatically if the pressure in the chamber $B^3$ exceeds the pressure in the chamber $B^2$ by an amount sufficient to lift the valve $K^4$, the main valve member will move into its fully open position and remain therein if and so long as a pressure exists in the passage $B^5$ sufficient to cause the valve $K^4$ to lift.

Figure 6:
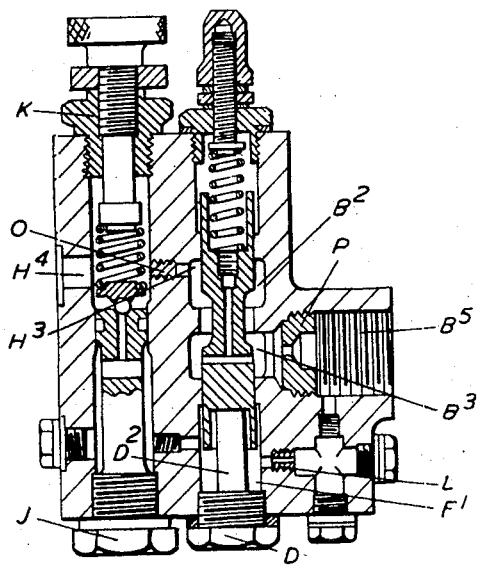

In the construction shown in Figure 6 the arrangement of the valve is similar to that shown in Figure 5 except that the passage $H^3$ is closed by a plug O and the passage $H^4$ is open and is assumed to be connected to a source of fluid pressure other than that in the outlet chamber $B^2$. In this construction therefore as in Figure 5 the main valve will normally maintain a predetermined pressure drop across the metering orifice P but will open completely if the pressure in the passage $B^5$ exceeds that in the source of pressure to which the passage $H^4$ is connected by an amount such that the relief valve $K^3$ opens. As long as the pressure in $B^5$ is thus insufficient to lift the valve $K^4$ and assuming the outlet chamber $B^2$ to be maintained at an appropriately low pressure the main valve moves to maintain a predetermined pressure drop across the metering orifice P but if the pressure in $B^5$ exceeds the predetermined value the valve $K^4$ will open thus limiting the pressure which can be maintained in the chamber $F^1$ and hence correspondingly the pressure which will be maintained in the chamber $B^3$.

Figure 7:
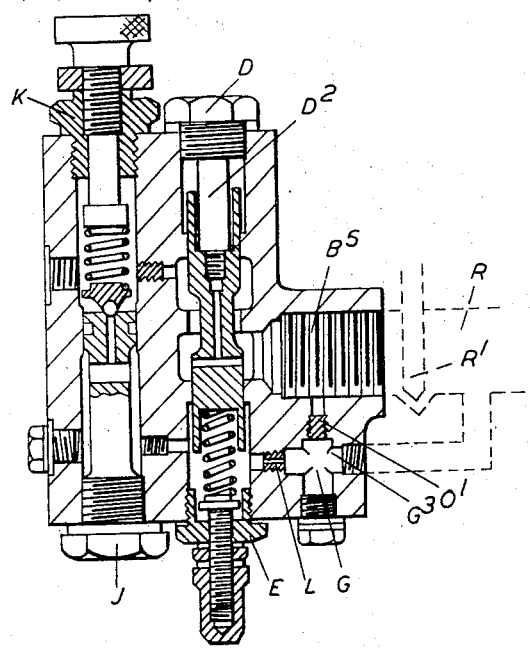

The arrangement of the valve shown in Figure 7 is similar to that shown in Figure 4 except that the inlet passage $B^5$ is connected to a main flow passage R containing a fixed or variable metering or flow control device $R^1$, and the passage R is connected on the upstream side of the device $R^1$ to the passage $G^3$ while the passage $B^5$ is shut off from the chamber G by a plug $O^1$.

This arrangement thus operates in a similar manner to that shown in Figure 4 except that, instead of a fixed metering orifice P the adjustable external metering or flow control device $R^1$ is provided so that the rate of flow at any moment is in accordance with the setting of the device $R^1$, the pressure drop across which is maintained constant.

Figure 8:
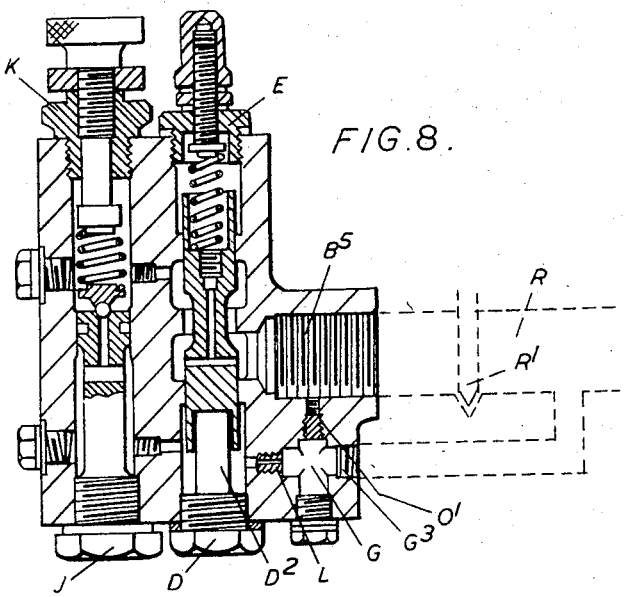

The arrangement shown in Figure 8 is similar to that shown in Figure 5 except that the passage $B^5$, instead of containing a fixed metering orifice P is connected to a main flow passage R containing an adjustable metering or flow control device $R^1$ the upstream side of which is connected to the chamber G through the passage $G^3$ while the chamber G, is shut off from the passage $B^5$ by a plug $O^1$ as in the arrangement shown in Figure 7. The arrangement shown in Figure 8 thus operates in a similar manner to that as shown in Figure 5 except that, instead of the rate of flow being controlled by the fixed metering orifice P it is controlled by the variable flow control device $R^1$, the pressure drop across which is maintained constant during normal operation.

Figure 9:
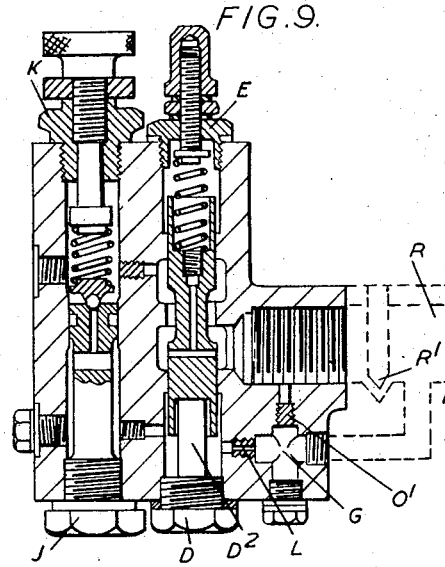

In the construction shown in Figure 9 the arrangement is similar to that shown in Figure 6 except that the metering orifice P is omitted and the passage $B^5$ is connected to a main flow passage R having a variable metering or flow control device $R^1$ the upstream side of which is connected to the chamber G through the passage $G^3$ while the chamber G is shut off from the passage $B^5$ by the plug $O^1$.

In this arrangement also therefore the operation of the valve unit is similar to that shown in Figure 6 except that the rate of flow through the passage $B^5$ is controlled by the variable control device $R^1$ instead of by the fixed metering orifice P.

Figure 10:
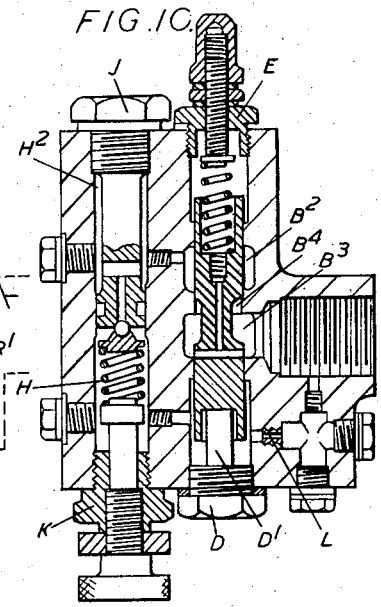

In the arrangement shown in Figure 10 the plug J is in the upper end $H^2$ of the relief valve chamber while the plug member K and its associated parts are in the lower end H of this chamber, the plug member D with the short stop $D^1$ being in the lower end of the main valve chamber while the plug member E with its associated parts is in the upper end of the main valve chamber. In this arrangement the valve unit operates as a relief valve with the chamber $B^2$ constituting the inlet chamber and the chamber $B^3$, the outlet chamber. Thus it will be seen that as long as the relief valve $K^4$ remains closed the main valve will remain in the position shown so that the port $B^4$ is closed. If however the pressure in the chamber $B^2$ becomes sufficient to open the relief valve $K^4$ flow of fluid through this valve will, owing to the restricted nature of the orifice L build up a pressure in the chamber $F^1$ sufficient to lift the main valve and thus open the port $B^4$. As soon as the pressure in the chamber $B^2$ drops to the point where the valve $K^4$ closes the pressure within the chamber $F^1$ will be relieved through the restricted orifice L so that the main valve closes, the rate of such closing being a function of the cross-section of the restricted orifice.

Figure 11:
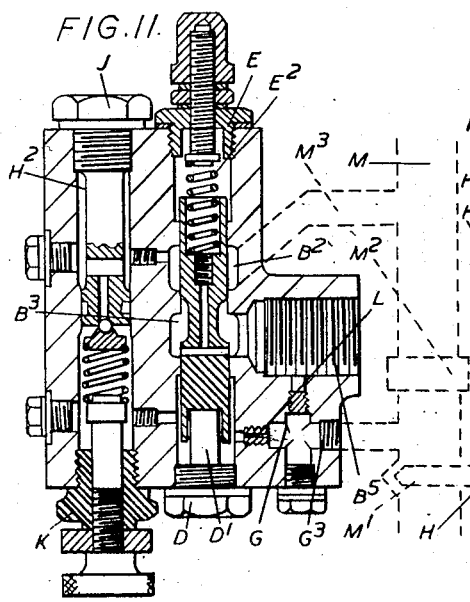

In the arrangement shown in Figure 11 the valve unit is assembled as shown in Figure 10 in association with a main flow line M in which is provided a metering or flow control orifice $M^1$ of the adjustable or fixed type, and also a "load" indicated diagrammatically at $M^2$ which may be assumed to be a hydraulic motor driving some suitable apparatus. The chamber G in this arrangement is connected through the passage $G^3$, from which the plug $G^5$ is omitted, to the passage M on the downstream side of the hydraulic motor $M^2$, while the passage M on the upstream side of the hydraulic motor $M^2$ is connected by a passage $M^3$ to the chamber $B^2$ of the valve. The chamber $B^3$ is connected through the passage $B^5$ to relief. With this arrangement, therefore, the spring $E^2$ tends always to maintain the main valve closed and this valve will be opened automatically against the action of this spring whenever the pressure between the hydraulic motor $M^2$ and the metering orifice $M^1$ exceeds a predetermined value, that is to say a value determined by the force exerted by the spring $E^2$ so as then to permit working liquid to escape from the upstream side of the hydraulic motor $M^2$ to relief. The valve unit therefore will act in effect to maintain always a substantially constant pressure in the part of the passage M between the hydraulic motor M² and the metering orifice M¹ so that the rate of flow through the metering orifice M¹ will be constant for any given setting of it and hence the rate of operation of the hydraulic motor M² will similarly be maintained constant in spite of changes of load within the range of loads with which the hydraulic motor can deal. Moreover should the pressure in the upstream part of the passage M at any time exceed that on the downstream side of the hydraulic motor by a predetermined maximum representing the pressure at which the subsidiary valve K⁴ will open, this valve will open and thereby build up pressure in the chamber F¹ to open the main valve. The complete valve unit, therefore, acts normally to control the rate of flow through the orifice M¹ and also as a relief valve should some predetermined maximum pressure in the passage M upstream of the hydraulic motor M² be experienced.

Figure 12:
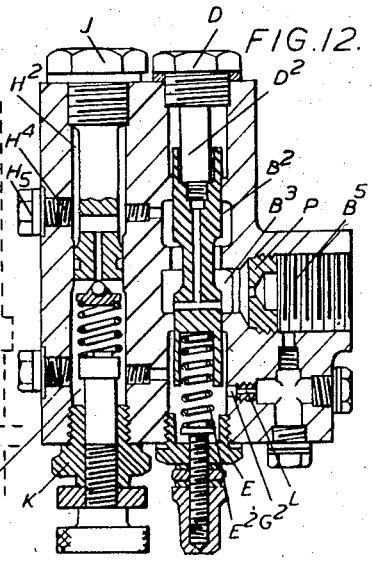

In the arrangement shown in Figure 12 the plug J is arranged in the upper end H² of the relief valve chamber and the plug K with its associated parts is arranged in the lower end of this chamber, the plug D with the longer stop D² is arranged in the upper end of the main valve chamber, while the plug E and its associated parts is arranged in the lower end of the main valve chamber, the passage B⁵ having mounted therein the metering orifice P, the passage H⁴ being closed by its plug H⁵, while the passage G² contains the restricted orifice L. With this arrangement the chamber B² and hence the upper end H² of the relief valve chamber is connected to the source of working pressure and the passage B⁵ is connected to relief. It will be seen that the main valve which is normally open will move downwards against the action of the spring E² whenever the pressure in the chamber B³ exceeds that in the passage B⁵ by a predetermined amount determined by the force of the spring E² in such a way as to tend to maintain across the orifice P a predetermined pressure drop. Moreover should the working pressure in the chamber B² at any time exceed some predetermined maximum at which the valve K⁴ will open, this will cause the main valve also to open.

Figure 13:
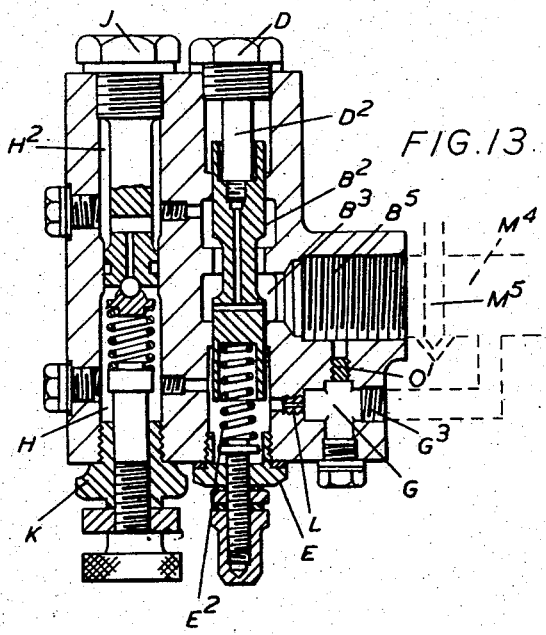

In the arrangement shown in Figure 13 the valve unit assembly is the same as that shown in Figure 12 except that the metering orifice P is omitted and, instead, the chamber B³ is connected through the passage B⁵ to a main outflow passage M⁴ through an external variable metering orifice device indicated at M⁵, the plug G⁵ being omitted and the passage M⁴ connected through the passage G³ to the chamber G, the passage G¹ being closed by a plug O¹. The valve unit therefore operates in the same general manner as that shown in Figure 12 except that the required pressure drop is normally maintained across the external metering orifice M⁵.

Figure 14:
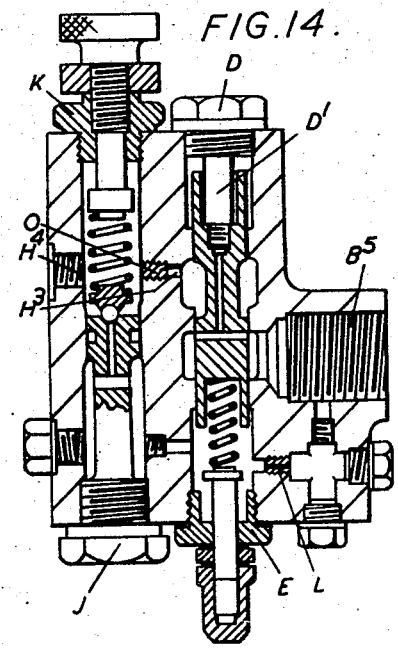

In the arrangement shown in Figure 14 the parts of the valve unit are arranged similarly to those in Figure 1 except that the passage H³ is closed by a plug O and the passage H⁴ is open to relief. In this arrangement the valve unit would be connected into a hydraulic system in a similar manner to that described with reference to Figure 1 except that the passage H⁴ would be connected to a relief passage or to a passage the pressure in which is independent of the pressure in the chamber B² so that the valve unit would act as a relief valve opening at a pressure in the passage B⁵ which is independent of the pressure in the outlet chamber B² and dependent on the pressure in the passage H⁴.

Figure 15:
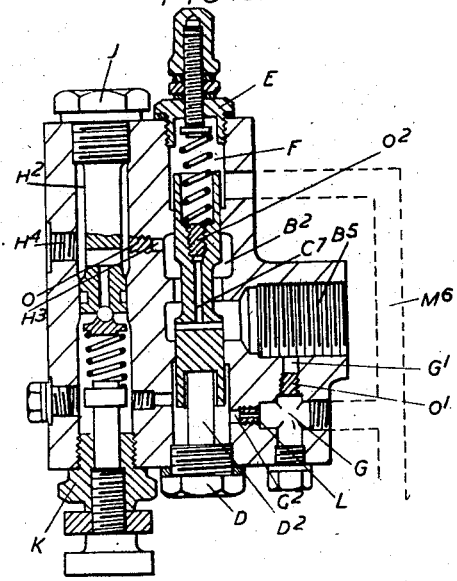

In the arrangement shown in Figure 15 the plug member J is in the upper end of the relief valve chamber and the plug member K and its associated parts in the lower end of this chamber, the plug member D with the longer stop D² being in the lower end of the main valve chamber while the plug member E and its associated parts are in the upper end of the main valve chamber. Moreover the passage H³ is closed by the plug O, the passage G¹ is closed by the plug O¹, and the passage C⁷ is closed by a plug O², the plug G⁵ being omitted, while the passage G² contains the restricted orifice L. In this arrangement the chamber F and the chamber G are connected to a relief passage M⁶ the passage B⁵ is connected to a main pressure source, the chamber B² is connected to an outlet and the chamber H² is connected through the passage H⁴ to an external pilot valve or to a selected point in the hydraulic system from which fluid can be admitted under appropriate conditions at a pressure sufficient to lift the relief valve K⁴. With this arrangement it will be seen that the main valve is normally open but will close when fluid at the appropriate pressure is delivered from the pilot valve to the chamber H² or occurs at the point referred to in the hydraulic system and for as long as delivery at such pressure is maintained, it being understood that as soon as the relief valve K⁴ closes the escape of fluid through the restricted orifice L would permit the main valve to reopen.

In the arrangement shown in Figure 16 the parts of the valve unit are assembled in a similar manner to those in Figure 15 except that the plug member D with the shorter stop D¹ is used so that the main valve normally occupies its closed position and the delivery of fluid at the predetermined pressure from the pilot valve or the selected point in the hydraulic system to open the relief valve K⁴ causes the main valve to open for as long as delivery at such pressure.

In the arrangement of valve unit shown in Figure 17 the parts of the valve unit are assembled as in the construction shown in Figure 3 except that the plug G⁵ is omitted and the passage C⁷ is closed by the plug O². In this assembly of the unit the passage B⁵ is connected to a main source of fluid pressure while the chamber B² is connected to an outlet, the passage H⁴ is connected to relief while the chambers F and G are connected to a passage M⁶ to which fluid can be admitted from an external pilot valve or from a selected point in the hydraulic system at a pressure sufficient to lift the relief valve K⁴. Thus in this arrangement the main valve remains open except when fluid is being admitted to the passage M⁶ at a pressure sufficient to lift the valve K⁴, at which periods the main valve is closed.

In the arrangement shown in Figure 18 the plug member J is in the upper end of the relief valve chamber while the plug member K and its associated parts are in the lower end of such chamber, the plug member D with the shorter stop D¹ being arranged in the lower end of the main valve chamber while the plug member E and its associated parts are in the upper end of the main valve chamber. The passage H³ is open, the passage G¹ is closed by the plug O¹, and the passage C⁷ is closed by the plug O². In this arrangement the chamber B² is connected to the main source of fluid pressure while the chamber F and the chamber G are connected to a relief passage M⁶. The arrangement thus operates in the same general manner as that shown in Figure 14 except that the direction of flow through the main valve is the opposite from that shown in Figure 14.

In the arrangement shown in Figure 19 the assembly of the valve unit is similar to that shown in Figure 17 except that the shorter stop D¹ is incorporated instead of the longer stop D². The operation is thus similar to that of the assembly shown in Figure 17 except that the main valve is normally closed and opens whenever the pressure in the passage M⁶ exceeds the predetermined valve causing the relief valve K⁴ to open.

What I claim as my invention and desire to secure by Letters Patent is:

1. A pressure responsive valve assembly the parts of which are applicable to divers modes of use in hydraulic systems, said assembly comprising a valve housing provided with a plurality of inlet and outlet flow passages, said housing having formed therein an open-ended main valve chamber and an open-ended pilot valve chamber each extending through said housing from end to end thereof, the main valve chamber comprising coaxial cylindrical end portions of the same effective diameter between which lie two coaxially spaced inlet and outlet flow chambers each connected to a different but corresponding one of said flow passages, said inlet and outlet flow chambers being separated by a cylindrical valve port which is coaxial with and of the same diameter as said end portions of the main valve chamber, a main valve member of the piston type slidably arranged within the main valve chamber with two piston-like end portions fitting in the end portions of the main valve chamber and an intermediate portion of smaller diameter than said end portions which extends through the valve port in the main valve chamber when the main valve is in open position, said end portions engaging with the ends of said valve port from opposite directions respectively when said valve is moved in either direction from its open position, a main valve spring abutment assembly closing one end of the main valve chamber and including a spring abutment and a spring one end of which bears against the abutment while the other end bears on the main valve member, a stop assembly closing the other end of the main valve chamber and including a stop member for limiting the movement of the main valve member towards the stop assembly, the closed end portions of the main valve chamber beyond the ends of the main valve member constituting pressure chambers in which pressures acting on the ends of the main valve member can exist and means for supplying fluid pressure to one of said pressure chambers, a pilot valve assembly including a part which closes one end of said pilot valve chamber and a part which separates said closed end portion from the other end portion of said pilot valve chamber thereby forming two end chambers thereof, said separating part containing a pilot passage connecting said end chambers one end of which passage forms a seating for a pilot valve, a pilot valve movable in one of said end chambers to engage with said seating, a pilot valve spring abutment assembly including a part which closes the valve seating end of the pilot valve chamber and a part constituting a pilot valve spring abutment, and a pilot valve spring one end of which bears against the pilot valve spring abutment and the other end of which acts on the pilot valve to maintain it normally in contact with its seating, said valve housing also having formed therein a flow passage connecting one end portion of the main valve chamber with said one end portion of the pilot valve chamber and at least one other flow passage adaptable for connecting the valve seating end portion of the pilot valve chamber with said fluid operated system, one of said valve assemblies and its coaxially arranged cooperating parts being interchangeable end for end in the valve chamber containing the same to provide different control conditions for said pressure responsive valve assembly as desired.

2. A pressure responsive valve assembly as claimed in claim 1, in which the movable valve assembly comprises the main valve stop assembly and the main valve spring abutment assembly, which are interchangeable in the ends of the main valve chamber.

3. A pressure responsive valve assembly as claimed in claim 1, in which the removable valve assembly comprises the pilot valve assembly and the pilot valve spring abutment assembly, which are interchangeable in the ends of the pilot valve chamber.

4. A pressure responsive valve assembly as claimed in claim 1, in which the means for supplying fluid pressure to one end of the main valve chamber communicates with the flow passage connected with the flow chamber of said one end through a passage of relatively restricted cross-section while said flow chamber of said one end also communicates with the other end of the main valve chamber through a passage of relatively unrestricted cross-section.

5. A pressure responsive valve assembly as claimed in claim 4, in which the passage through which the said one end of the main valve chamber communicates with the flow passage connected with the flow chamber of said one end includes a junction chamber communicating with the said end of the main valve chamber and with the said flow passage by passages each formed to receive either a plug member or a restricted orifice member.

6. A pressure responsive valve assembly as claimed in claim 5, in which the passage of relatively unrestricted cross-section extends through the main valve member.

7. A pressure responsive valve assembly as claimed in claim 1, in which one end of the main valve chamber communicates with the flow passage connected with the flow chamber of said one end through a passage of relatively restricted cross-section, and said flow chamber of said one end also communicates with the other end of the main valve chamber through a passage of relatively unrestricted cross-section extending through the main valve member.

8. A pressure responsive valve assembly as claimed in claim 1, in which the main valve member is formed with a passage extending therethrough, one end of said passage opening into said other end of the main valve chamber while the other end of said passage opens into the flow chamber of said one end of the main valve chamber.

9. A pressure responsive valve assembly as claimed in claim 8, in which the said passage through the main valve member is formed at one end to receive a closing plug.

References Cited in the file of this patent

UNITED STATES PATENTS

| | | |
|---|---|---|
| 2,043,453 | Vickers | June 9, 1936 |
| 2,360,816 | Pasco | Oct. 17, 1944 |

FOREIGN PATENTS

| | | |
|---|---|---|
| 542,114 | Great Britain | Dec. 24, 1941 |